Aug. 20, 1957     E. S. DUNN     2,803,763
HEAT DISSIPATION IN ROTORS OF ELECTRIC MOTORS
Filed Sept. 27, 1954
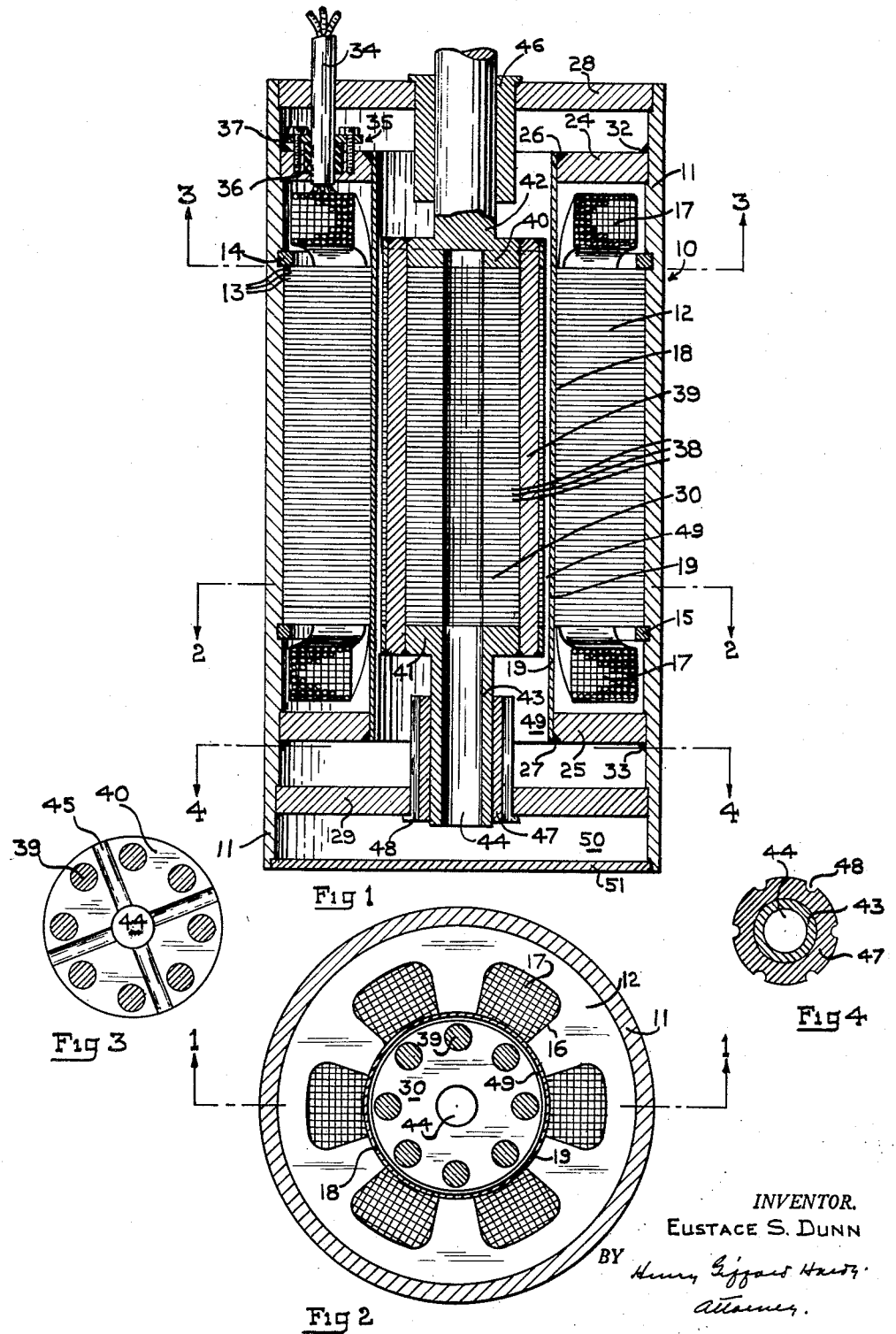
INVENTOR.
EUSTACE S. DUNN

United States Patent Office 2,803,763
Patented Aug. 20, 1957

2,803,763

HEAT DISSIPATION IN ROTORS OF ELECTRIC MOTORS

Eustace S. Dunn, Piedmont, Calif.

Application September 27, 1954, Serial No. 458,353

2 Claims. (Cl. 310—54)

This invention relates to alternating current electric motors in which the rotor is of the conventional squirrel-cage construction. More particularly it relates to motors of the type which are immersed in a fluid, and in which the stator and windings are sealed for protection against the action of the fluid in which the motor is operated. Motors of this type are used, for example, in submersible pumps which are, in effect, turbine pumps with a close-coupled electric motor, both pump and motor being immersed in the water, oil or other fluid to be pumped.

In the construction of motors of the aforementioned type it is preferred practice to enclose the stator and stator windings in a protective housing and to seal the bore of the stator within which the rotor is mounted, by means of a tubular lining sleeve so that fluid cannot enter the space containing the windings, and to permit the fluid to be pumped to inundate the annular space between the rotor and the tubular lining sleeve.

In this type of construction the heat developed in the stator due to iron and copper losses is satisfactorily dissipated by conduction through the walls of the motor housing whence it passes into the fluid in which the motor is immersed.

The heat that is developed in the rotor due to iron and copper losses, however, cannot be directly dissipated in the same manner, but must be carried away partly by radiation radially into the stator, partly by conduction longitudinally along the rotor and shaft, and partly by convection through the thin annular ring of fluid lying between the rotor and the bore of the stator.

These means are frequently insufficient to dissipate the heat developed in the rotor and result in an undesirable increase in the rotor temperature and the creation of dangerous hot spots therein.

The invention provides means by which a greater volume of fluid is brought into contact with the external portion of the motor housing whence the heat passes into the fluid in which the motor is immersed.

The invention is applicable generally to any conventional type of squirrel-cage rotor, but more particularly to reinforced fluid tight rotors which are the subject of my copending application, Serial Number 458,350, filed September 27, 1954.

According to the invention a squirrel-cage rotor of the type last described is provided with a central bore for part of its length, means for pumping the fluid within the motor in a circulatory manner so that the fluid is sucked through the central bore in the rotor from a reservoir contained within the external motor housing and pumped back into the reservoir after first flowing round the periphery of the rotor.

Thus, the fluid sucked from the reservoir by the pumping device absorbs heat from the central portion of the rotor while traversing the central bore of the rotor on its way to the pumping device, and it absorbs heat from the outer portion of the rotor while traversing the annular space around the rotor back to the reservoir. Within the reservoir the fluid is in continuous circulation against the external housing of the motor which conducts the heat to the fluid in which the motor is immersed.

The objects, features and advantages of this invention will appear more fully from the detailed description which follows accompanied by drawings showing, for the purpose of illustration, a preferred embodiment of this invention. The invention also consists in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1 is a vertical section showing the essential elements of a motor incorporating the invention, the section being taken on the line 1—1 of Figure 2.

Figure 2 is a transverse section of the structure shown in Figure 1, the section being taken on the line 2—2 of Figure 1.

Figure 3 is an inverted section of a portion of the structure shown in Figure 1, the section being taken on the line 3—3 of Figure 1.

Figure 4 is a transverse section of a portion of the structure shown in Figure 1, the section being taken on the line 4—4 of Figure 1.

In the following description and in the claims, various details will be identified by specific names for convenience. These names, however, are intended to be as generic in their application as the art will permit. Corresponding reference characters refer to corresponding parts in the several figures of the drawings.

In the drawings accompanying, and forming part of the specification, certain specific disclosure of the invention is made for the purpose of explanation of broader aspects of the invention, but it is understood that the details may be modified in various respects without departure from the principles of the invention and that the invention may be applied to other structures than the one shown.

Referring to Figures 1 and 2, the motor 10 is enclosed in an outer pressure resistant housing 11 of stainless steel or bronze. The stator 12 comprises a stack of stator laminations 13 assembled in a conventional manner and held in the outer housing by retaining rings 14 and 15.

The stator laminations are blanked out to provide radially extending slots 16 for the stator windings 17. The stator laminations have a central bore 18 within which a lining sleeve 19 is fitted.

The stator enclosure further comprises annular end pieces 24 and 25 secured to the housing by solder joints 32 and 33, and to the lining sleeve 19 by solder joints 26 and 27. Thus, the stator laminations are completely enclosed and are protected against the fluid within which the motor may be operated.

A cable 34 extends into the stator space through a seal or gland 35 of suitable construction. The details of the gland construction do not form part of this invention. For this reason, the cable entry is shown only in a simplified manner as comprising a rubber ring 36 compressed by a face plate 37.

A rotor 30 of conventional squirrel-cage design is mounted for rotation within and concentric to the stator bore. The rotor 30 comprises a stack of laminated discs 38 containing a plurality of rotor bars 39 axially contained adjacent their periphery, end pieces 40 and 41 serving as short circuiting elements extended to form shafts 42 and 43 and to which the rotor bars are secured. It is to be noted that there is an annular space 49 between the rotor and the inner face of the tubular sleeve 18.

The stack of laminated discs 38 and the end pieces 40 and 41 and shaft 43 are pierced axially by a hole 44 of relatively small diameter. It will be observed that end piece 41 and its shaft 43 are completely pierced by the hole 44 while end piece 40 is pierced only a short distance axially and shaft 42 not at all.

The surface of the end piece 40 in contact with the stack of laminated discs 30 is provided with radial grooves 45 which during rotation impart to it the characteristics of a centrifugal pump impeller as shown in Figure 3.

The shafts 42 and 43 rotate in sleeve bearings 46 and 47, which are supported in annular rings 28 and 29 attached to the ends of the motor housing 11. The sleeve bearing 47 is grooved exteriorly at 48, as shown in Figure 4, to allow the passage of fluid from the annular space 49 surrounding the rotor into the reservoir 50. The reservoir 50 is formed by disc 50 closing the end of an extension of the motor housing 11.

When the motor operates, fluid is drawn from the reservoir 50 through the rotor hole 44 by the sucking action of grooves 45 and discharged therefrom into the annular space 49, whence it passes through grooves 48 back into the reservoir 50, in which it circulates and yields up its heat to the motor housing 11. Thus, the heat which the fluid has absorbed in passing through and around the rotor is dissipated through the housing 11 to the surrounding liquid and thereby lowers the rotor temperature.

I claim:

1. Rotor heat dissipating means for electric motors sealed for liquid tight immersed operation and having a separately sealed stator therein, comprising a motor having a liquid tight housing, a separately sealed stator in said housing, a rotor mounted axially for rotation within said stator leaving an annular passage therebetween, said rotor having outwardly extending shafts one of which pierces the housing and the other is enclosed therein, radial flanges on said shafts forming end pieces for said rotor, said rotor, end pieces and enclosed shaft having a continuous axial passage therethrough, lateral passages in the end piece associated with the shaft which pierces the housing communicating with said axial passage and the said annular passage between the rotor and the sealed stator, bearings for said shafts, the bearing for said enclosed shaft being grooved externally to permit the flow of liquid past said bearing from the annular passage to a heat exchange reservoir, and a heat exchange reservoir within sealed housing communicating with the axial passage in said enclosed shaft.

2. A submersible electric motor comprising a sealed fluid tight housing for said motor, a stator and windings sealed in its own container within said housing, a rotor within said housing mounted for rotation within the cylindrical bore of the stator leaving an annular passage therebetween, outwardly extending shafts on said rotor, one of which pierces the housing and the other is enclosed therein, sleeve bearings for each of the shafts, the one for the enclosed shaft being axially grooved to provide external passages, internal annular flanges formed on said shafts providing end plates for said rotor, an impeller formed transversely within the flange of the shaft which pierces the housing, the outlet of said impeller communicating with the annular passage, an axial bore extending continuously through the enclosed shaft and rotor and communicating with said impeller, and a reservoir at the housing end enclosing the shaft communicating with said axial bore and with the grooves in said sleeve bearing.

References Cited in the file of this patent

UNITED STATES PATENTS

| | | |
|---|---|---|
| 2,001,649 | Arutunoff | May 14, 1935 |
| 2,055,480 | Coberly | Sept. 29, 1936 |
| 2,576,141 | Pike | Nov. 27, 1951 |